(12) United States Patent
Willems, Jr. et al.

(10) Patent No.: US 7,224,549 B1
(45) Date of Patent: May 29, 2007

(54) APPARATUS FOR POSITIONING A DATA STORAGE DEVICE

(75) Inventors: John D. Willems, Jr., Arvada, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 432 days.

(21) Appl. No.: 10/847,520

(22) Filed: May 17, 2004

(51) Int. Cl.
  *G11B 15/60* (2006.01)
(52) U.S. Cl. .................................. 360/96.5; 369/30.48
(58) Field of Classification Search ............... 360/96.5; 369/30.48
  See application file for complete search history.

(56) References Cited

U.S. PATENT DOCUMENTS

| | | | |
|---|---|---|---|
| 4,546,396 A | | 10/1985 | Schatteman |
| 4,638,386 A | * | 1/1987 | Takamatsu ............... 360/96.5 |
| 4,654,730 A | * | 3/1987 | Fleck et al. ............... 360/96.5 |
| 4,654,840 A | * | 3/1987 | Takahashi .................. 720/605 |
| 4,785,364 A | * | 11/1988 | Ando et al. ............... 360/96.5 |
| 4,924,335 A | * | 5/1990 | Inoue .......................... 360/93 |
| 4,996,612 A | * | 2/1991 | Suda ......................... 360/96.5 |
| 5,615,066 A | * | 3/1997 | Shibata ..................... 360/96.5 |
| 5,754,360 A | * | 5/1998 | Lee et al. .................... 360/85 |
| 5,754,363 A | * | 5/1998 | Asakura .................... 360/96.5 |
| 6,057,980 A | | 5/2000 | Todd et al. |
| 6,108,161 A | | 8/2000 | Todd et al. |
| 6,215,614 B1 | | 4/2001 | Todd et al. |
| 6,229,440 B1 | | 5/2001 | Fairchild |
| 6,320,722 B1 | | 11/2001 | Tsuchiya et al. |
| 6,392,836 B1 | | 5/2002 | Kim |
| 6,392,837 B1 | | 5/2002 | Kim |
| 6,437,938 B1 | | 8/2002 | Wada |
| 6,466,399 B1 | | 10/2002 | Fairchild |
| 6,471,150 B1 | | 10/2002 | Tsuchiya et al. |

\* cited by examiner

*Primary Examiner*—Jefferson Evans
(74) *Attorney, Agent, or Firm*—Brooks and Kushman P.C.

(57) ABSTRACT

An apparatus for positioning a data storage cartridge. The apparatus includes a shuttle, a frame, and a lift mechanism. The shuttle is adapted to receive the data storage cartridge. The frame is adapted to receive the shuttle and has a stop. The lift mechanism is configured to move the shuttle between an unloaded position and a loaded position. The stop inhibits movement of the shuttle when the shuttle is in the unloaded position.

20 Claims, 3 Drawing Sheets

APPARATUS FOR POSITIONING A DATA STORAGE DEVICE

BACKGROUND OF THE INVENTION

1. Field of the Invention

The present invention relates to an apparatus for positioning a data storage device, and more particularly to an apparatus for positioning a data storage device, such as a tape cartridge, to engage or disengage a drive module.

2. Background Art

A mechanism for loading and unloading cassettes or discs is disclosed in U.S. Pat. No. 4,546,396.

SUMMARY OF THE INVENTION

According to one aspect of the present invention, an apparatus for positioning a data storage device is provided. The apparatus includes a shuttle, a frame, and a lift mechanism. The shuttle is adapted to receive the data storage device. The frame is adapted to receive the shuttle and includes a stop. The lift mechanism is configured to move the shuttle between an unloaded position and a loaded position. The stop is configured to inhibit movement of the shuttle when the shuttle is in the unloaded position.

The stop may be disposed proximate a top surface of the side panel. The stop may include a cushion disposed proximate the shuttle when the shuttle is in the unloaded position. The cushion may be at least partially compressed by the shuttle when the shuttle is in the unloaded position.

The shuttle may include a cam pin. The lift mechanism may include a cam feature configured to engage the cam pin to move the shuttle between the unloaded and loaded positions. The lift mechanism may also include a motor and a set of gears disposed on the frame. The set of gears may be configured to rotate the cam feature in response to rotation of the motor.

According to another aspect of the present invention, an apparatus for positioning a data storage cartridge is provided. The apparatus includes a drive module, a frame, a shuttle, and a lift mechanism. The frame is disposed proximate the drive module and includes first and second side panels. The first and second side panels include first and second stops. The shuttle is adapted to receive the data storage cartridge and is movably disposed between the first and second side panels. The lift mechanism is disposed proximate the frame and is configured to move the shuttle between an unloaded position and a loaded position. The first and second stops are configured to inhibit the cartridge from tilting when the shuttle is in the unloaded position.

The first and/or second stops may include a flexible portion adapted to move when contacted by the shuttle. The first and second stops may be disposed in a common plane.

The shuttle may include a cam pin and a guide pin. The frame may include a cam pin slot and a guide pin slot. The guide pin may extend through the guide pin slot. The cam pin may extend through the cam pin slot to engage a cam feature. The cam feature may include a spiral groove configured to engage the cam pin and move the shuttle when rotated.

The cam feature may include a gear portion. The lift mechanism may include a motor having an output shaft, an output gear disposed on the output shaft, and at least one intermediate gear adapted to rotatably couple the output gear and the gear portion.

According to another aspect of the present invention, an elevator assembly for positioning a data storage cartridge is provided. The elevator assembly includes a shuttle, a frame, and a lift mechanism. The shuttle includes an opening, a backstop, and first and second side members. The opening is adapted to receive the data storage cartridge. The backstop is positioned opposite the opening and inhibits movement of the data storage cartridge in a first direction. The first and second side members are configured to inhibit movement of the data storage cartridge in a second direction. The first and second side members include first and second cam pins. The frame includes first and second panels having first and second cam slots and first and second stops. The first and second stops are configured to inhibit movement of the data storage cartridge in a third direction. The lift mechanism includes a motor, a first set of gears, a second set of gears, and first and second cam features. The motor has an output shaft and an output gear disposed on the output shaft. The first set of gears is rotatably coupled to the first panel and is engageable with the output gear. The second set of gears is rotatably coupled to the second panel and connected to the first set of gears by a shaft. The first and second cam features are configured to be engaged by the first and second sets of gears. The first and second cam features are adapted to engage the first and second cam pins to move the shuttle between an unloaded position and a loaded position. The first set of gears may have more gears than the second set of gears.

DETAILED DESCRIPTION OF THE PREFERRED EMBODIMENT(S)

Figure 1:
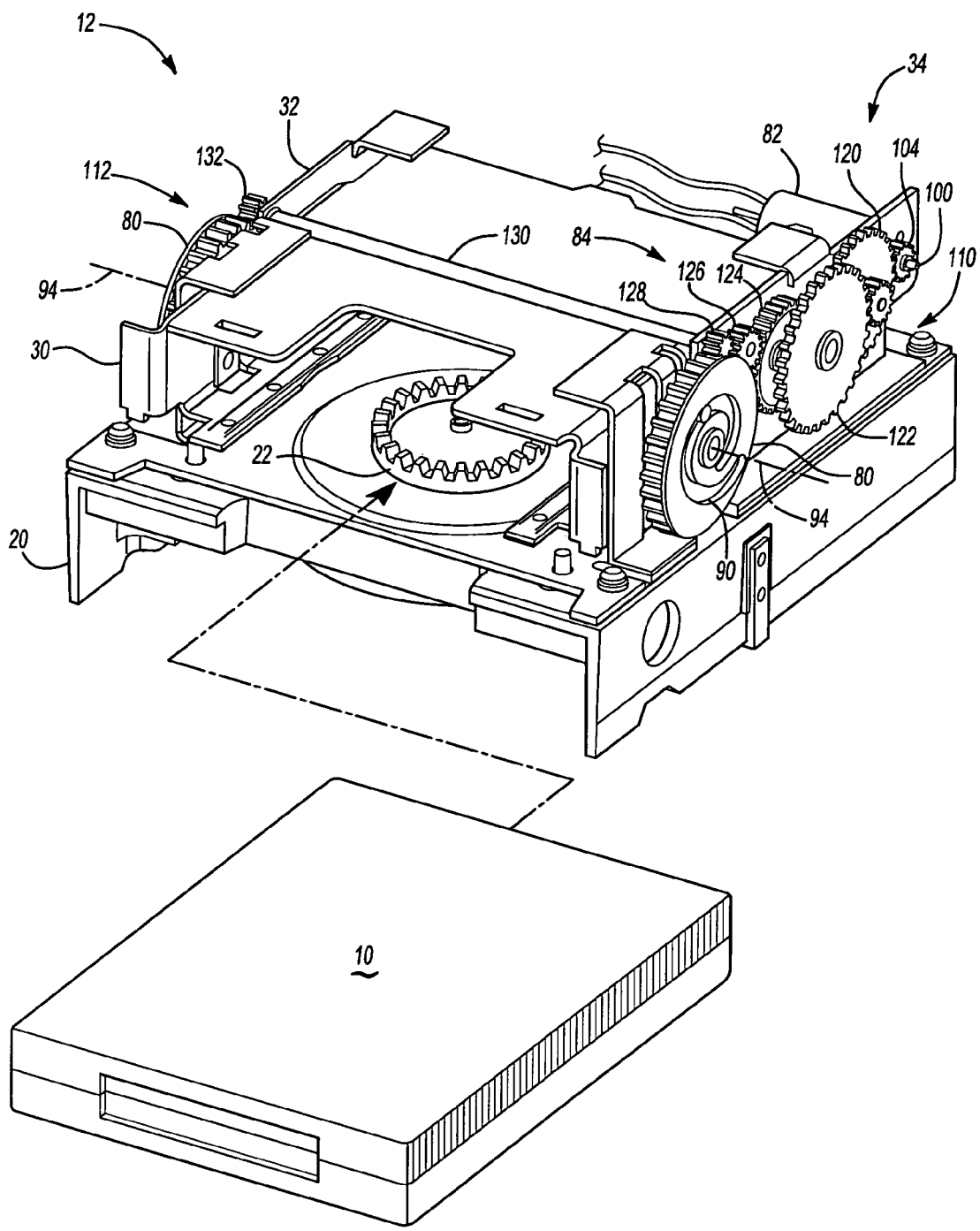
FIG. 1 is a perspective view of a data storage cartridge and one embodiment of an apparatus for positioning a data storage cartridge.

Certain terminology presented below is used for convenience in reference only and is not intended to be limiting. More specifically, directional language such as "left", "right", "front", "back", "top", "bottom", up "down", "raised", "lowered" and words of similar import designate directions shown in the drawings. Such directional terminology is used for clarity and is not intended to limit the orientation of any aspect of the invention to a particular plane or direction.

Referring to FIG. 1, a data storage device 10 and a positioning apparatus 12 are shown. The storage device 10 may include any suitable type of data storage media, such as a tape or optical disc. The storage device 10 may have any suitable configuration. In the embodiment shown, the storage device 10 is configured as a tape cartridge.

The positioning apparatus 12 or tape drive unit is configured to receive the storage device 10 and move between a first or loaded position and a second or unloaded position. The positioning apparatus 12 is in the loaded position when the storage device 10 is proximate a drive module 20. The positioning apparatus 12 is in the unloaded position when the storage device 10 is spaced from the drive module 20.

The positioning apparatus 12 may be incorporated with a data storage library. In a data storage library, a robot or other suitable mechanism may be employed to retrieve and/or insert a storage device into the positioning apparatus 12. The positioning apparatus 12 must accurately locate the storage device 10 when disposed in the unloaded position to allow the robot to reliably and repeatably retrieve the storage device 10. Moreover, the positioning apparatus 12 may need to withstand high impact loads that may occur when the robot contacts or "slams" into the storage device 10. Such impact loads may tilt or misposition the storage device 10 and thereby impair retrieval operations. In such circumstances, it is desirable to configure the positioning apparatus 12 to inhibit tilting or mispositioning of the storage device.

The drive module 20 is configured to rotate the storage device 10 or a portion thereof to facilitate the storage and retrieval of data. In one embodiment, the drive module 20 includes a hub 22 configured to engage the storage device 10.

The positioning device 12 may include a shuttle 30, a frame 32, and a lift mechanism 34. The shuttle 30 is adapted to receive the storage device 10. The frame 32 is configured to receive the shuttle 30. The lift mechanism 34 is configured to move the shuttle 30 between the unloaded and loaded positions. The shuttle 30, frame 32, and lift mechanism 34 may have any suitable configurations and are not intended to be limited to the embodiment shown in FIG. 1 as discussed below.

Figure 2:
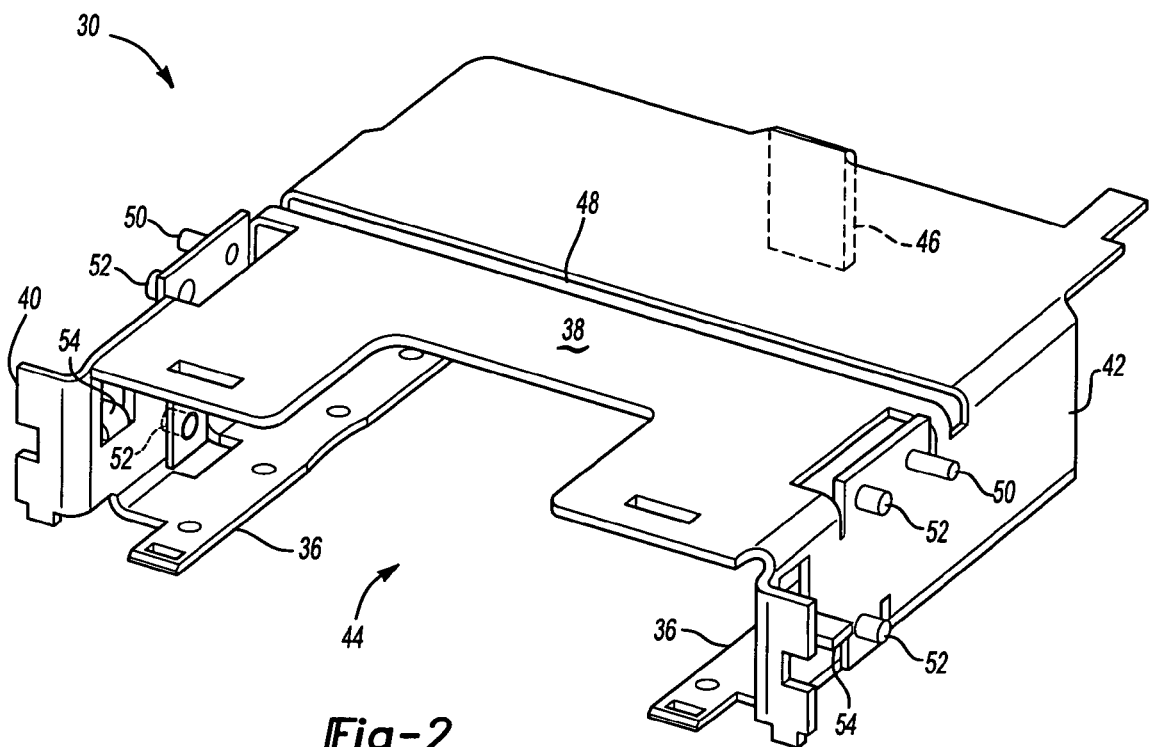
FIG. 2 is a perspective view of a shuttle.

Referring to FIG. 2, one embodiment of the shuttle 30 is shown. The shuttle 30 may have any suitable configuration. In addition, the shuttle 30 may be made of any suitable material, such as a polymeric material or metal like stainless steel.

The shuttle 30 includes one or more bottom panels 36 adapted to support the storage device 10. Optionally, the shuttle 30 may include a top panel 38, a left panel 40, and/or a right panel 42. The bottom, top, left, and right panels 36,38,40,42 may be integrally formed. Alternatively, the bottom, top, left, and right panels 36,38,40,42 may be any combination of integrally formed and/or separate components that are connected in any suitable manner, such as by welding, fasteners, or an adhesive.

An opening 44 may be disposed proximate the top, bottom, left, and right panels 36,38,40,42. The opening 44 may be configured to allow the storage device 10 to be inserted into the shuttle 30.

The left and right panels 40,42 may be configured to inhibit movement of the storage device 10 in a first direction. A backstop 46 may be configured to inhibit movement of the storage device 10 in a second direction. More specifically, the backstop 46 inhibits rearward movement of the storage device 10 upon insertion into the shuttle 30. The backstop 46 may be disposed on the bottom, top, left, and/or right panels 36,38,40,42. In the embodiment shown, the backstop 46 is integrally formed with the top panel 38.

Optionally, the top panel 38 may also include a slot 48 extending from the left panel 40 to the right panel 42.

The shuttle 30 may include one or more cam pins 50 and one or more guide or bearing pins 52. The cam and bearing pins 50,52 may have any suitable configuration and may be made of any suitable material, such as a polymeric material or metal like stainless steel. The cam and bearing pins 50,52 may be solid or hollow. In addition, the cam and bearing pins 50,52 may have similar or different geometries and/or orientations. In one embodiment, the cam pins 50 are longer and have a smaller diameter than the bearing pins 52. Furthermore, individual cam pins 50 and individual bearing pins 52 may have different configurations.

In the embodiment shown in FIG. 2, the left and right panels 40,42 each have one cam pin 50 and two bearing pins 52 disposed substantially parallel each other. Moreover, the cam and bearing pins 50,52 on the left panel 40 are disposed coaxially with the corresponding cam and bearing pins 50,52 on the right panel 42.

Optionally, the shuttle 30 may include one or more impact diverter tabs 54 for transferring force from the shuttle 30 to another component, such as the frame 32, when the storage device 10 is inserted or removed. In addition, a bearing (not shown) may be disposed around the bearing pins 52 to inhibit wear.

Figure 3:
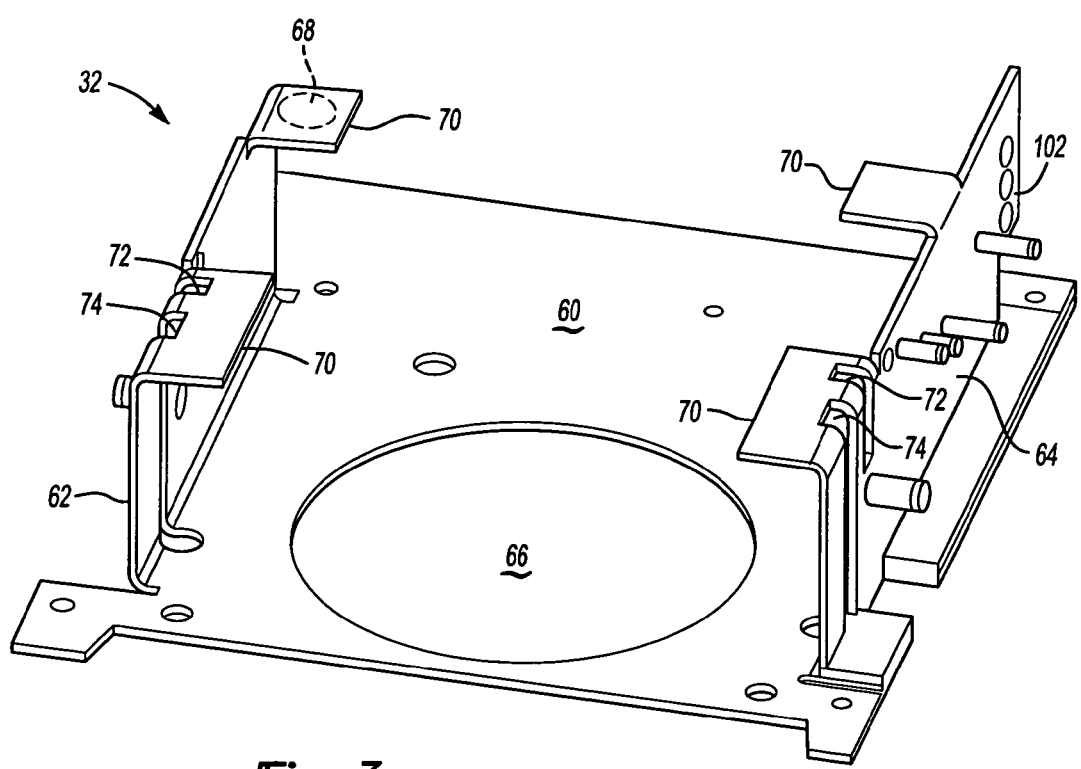
FIG. 3 is a perspective view of a frame.

Referring to FIG. 3, one embodiment of the frame 32 is shown in more detail. The frame 32 is configured to receive the shuttle 30 and to permit the shuttle to move between the unloaded and loaded positions.

In the embodiment shown, the frame 32 includes a base panel 60, a left panel 62, and a right panel 64. The base, left, and right panels 60,62,64 may be integrally formed or may be separate components that are connected in any suitable manner, such as by welding, fasteners, or an adhesive.

The left and right panels 62,64 may have similar or different configurations. In the embodiment shown, the left and right panels 62,64 are asymmetrical and are disposed substantially parallel to the left and right panels 40,42 of the shuttle 30.

Referring to FIGS. 1 and 3, the frame 32 may be configured to mount on the drive module 20. In the embodiment shown, the base plate 60 is disposed on the drive module 20. The base plate 60 may have any suitable configuration and may include an aperture 66 that allows the hub 22 of the drive module 20 to engage the storage device 10.

Referring again to FIG. 3, the left and right panels 60,62 may include one or more stops 70. Optionally, the frame 32 may also include one or more cam slots 72 and one or more bearing slots 74.

The stops 70 are configured to affect the positioning of the storage device 10 and/or shuttle 30. More specifically, the stops 70 may be configured to contact the storage device 10 and/or the shuttle 30 to inhibit mispositioning or tilting of the storage device 10 when the shuttle 30 is in the unloaded position.

In the embodiment shown, the stops 70 are disposed in pairs on the left and right panels 62,64, respectively. However, any suitable number of stops may be employed. The stops 70 may have any suitable configuration. In the embodiment shown, the stops are disposed on a plane. Furthermore, the stops 70 may be integrally formed with the left and right panels 62,64 or may be separate components.

Optionally, one or more of the stops 70 may include a pliant or flexible portion. The flexible portion helps insure that the lift mechanism 34 can be completely actuated to the unloaded position and to inhibit wear on the lift mechanism 34. The flexible portion may have any suitable configuration. For example, in one embodiment, the stop 70 may include a cushion 68 that is partially compressed when the shuttle is in the unloaded position. Alternately, at least a portion of the stop body may flex or bend when contacted by the storage device 10 and/or the shuttle 30. The flexible portion may be made of any suitable material, such as an elastomeric material like rubber or EPDM (ethylene propylene diene terpolymer). Moreover, a foam layer may be employed if the flexible portion is configured as a cushion.

The cam slots 72 and bearing slots 74 are configured to receive the cam pins 50 and bearing pins 52, respectively. The cam and bearing slots 72,74 may have similar or different geometries and/or orientations. For example, in one embodiment, the cam slots 72 are shorter and narrower than the bearing slots 52. Furthermore, individual cam slots 72 and individual bearing slots 74 may have different configurations.

In the embodiment shown in FIG. 3, the left and right panels 40,42 each have one cam slot 72 and one bearing slot 74. The cam and bearing slots 72,74 are disposed parallel to each other and permit the cam and bearing pins 50,52 to slide within the cam and bearing slots, 72,74, respectively. More specifically, each bearing slot 74 is configured to receive a pair of bearing pins 52. Alternatively, an individual bearing slot may be provided for each bearing pin.

The lift mechanism 34 is adapted to actuate the shuttle 30 between the unloaded and loaded positions. The lift mechanism 34 may have any suitable configuration for moving the shuttle 30. For example, the lift mechanism 34 may be any mechanical, pneumatic, electromechanical, and/or electrical mechanism adapted to actuate the shuttle 30. For instance, the lift mechanism 34 may be one or more pneumatic cylinders, hydraulic cylinders, springs, motors, linkages, gears, or combinations thereof.

Referring again to FIG. 1, one embodiment of the lift mechanism 34 includes a cam feature 80 and an actuator or motor 82. The lift mechanism 34 may also include at least one set of gears as discussed below.

Figure 4:
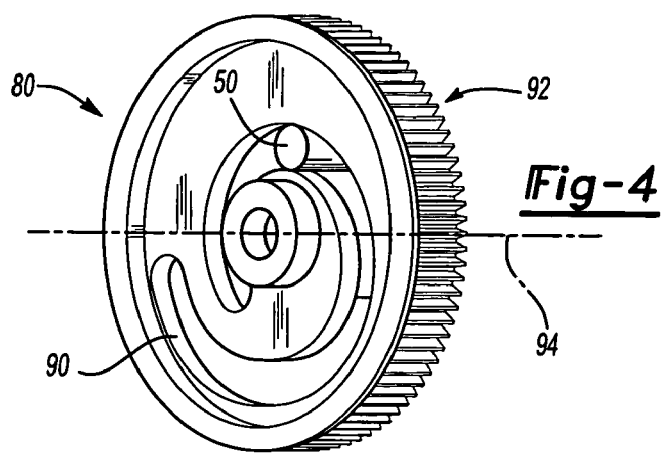
FIG. 4 is a perspective view of a cam feature.

Referring to FIG. 4, one embodiment of the cam feature 80 is shown in more detail. The cam feature 80 includes a spiral slot 90 and a gear portion 92 disposed about an axis of rotation 94. The cam feature 80 may have any suitable configuration and may be made of any suitable material, such as a polymeric material or metal.

The spiral slot 90 is configured to receive and engage a cam pin 50. More specifically, the spiral slot 90 is configured to transmit force to the cam pin 50 when the cam feature 80 is rotated. The spiral slot 90 may extend through the cam feature 80 or may be a blind slot having a bottom surface.

In the embodiment shown, one cam feature 80 is associated with each cam pin 50. Specifically, a first cam feature is rotatably disposed on the left panel 62 and a second cam feature is rotatably disposed on the right panel 64. Moreover, the spiral slots of the first and second cam features may be mirror images of each other to facilitate positioning of the shuttle 30.

Referring to FIG. 1, the motor 82 includes an output shaft 100 and may be adapted to mount to the frame 32. In one embodiment, the output shaft 100 extends through a first aperture 102 disposed in the right panel 64 of the frame 32. An output gear 104 may be disposed on the output shaft 100. The motor 82 may be any suitable type, such as a 12 volt DC motor.

Figure 5:
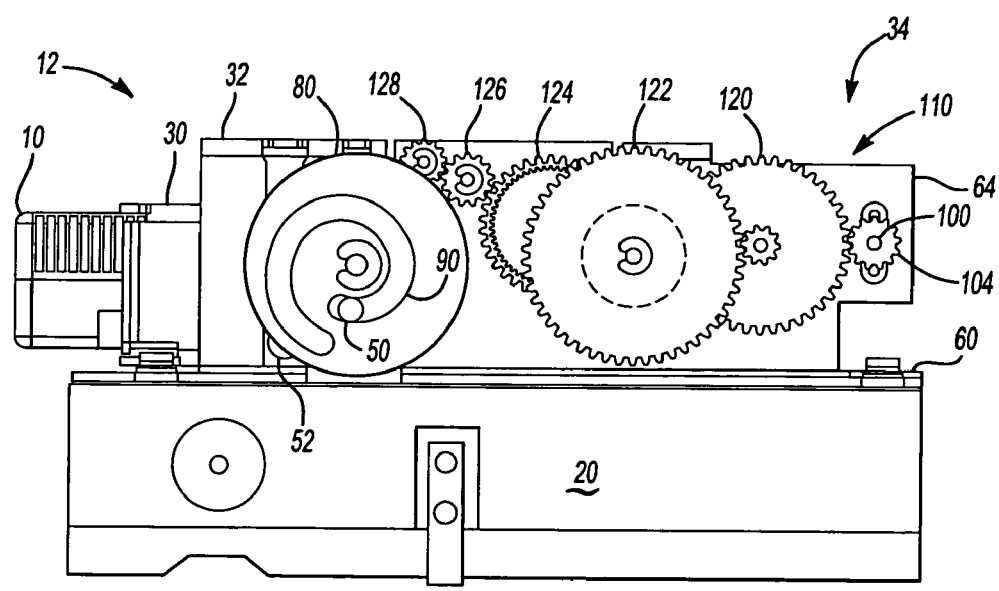
FIG. 5 is a right side view of the apparatus disposed in a loaded position.
Figure 6:
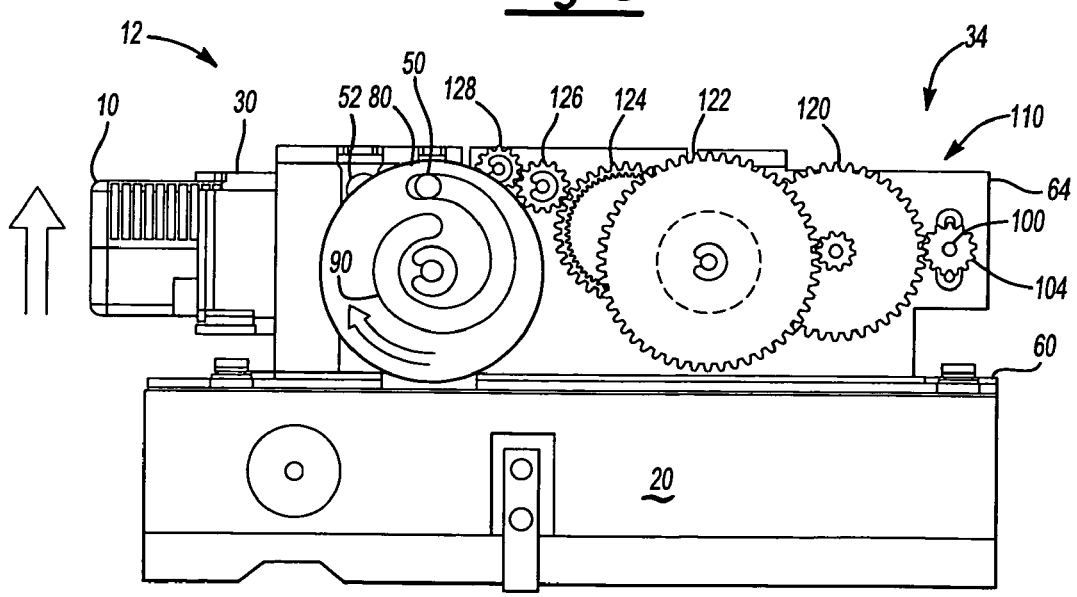
FIG. 6 is a right side view of the apparatus disposed in an unloaded position.

Referring to FIGS. 1, 5, and 6, one embodiment of the lift mechanism 34 is shown in more detail. In this embodiment, the lift mechanism 34 includes a first set of gears 110 and a second set of gears 112. The first and second sets of gears 110, 112 are adapted to turn the cam features 80 in response to rotation of the motor 82.

The first and second sets of gears 110, 112 may have any suitable number of individual gears or gear surfaces. These gears may be rotatably disposed on the frame 32 in any suitable manner. In one embodiment, the each gear is disposed on a shaft extending from the left or right panel 62,64. A fastener, such as a clip, may be used to secure each gear to its respective shaft. The gears may have any suitable configuration and may be made of any suitable material, such as a metal or polymeric material.

In one embodiment, the first set of gears 110 include a first gear 120, a second gear 122, a third gear 124, a fourth gear 126, and a fifth gear 128. The first, second, third, fourth, and fifth gears 120,122,124,126,128 are configured to rotatably engage each other. In the embodiment shown, the first gear 120 is configured to drive the second gear 122, the second gear 122 is configured to drive the third gear 124, the third gear 124 is configured to drive the fourth gear 126, and the fourth gear is configured to drive the fifth gear 128.

The fifth gear 128 is disposed on a connecting shaft 130. The connecting shaft 130 may be rotatably disposed on the frame 32. In addition, the connecting shaft 132 may be at least partially disposed in the clearance slot 46 when the shuttle 30 is raised.

The second set of gears 112 includes a sixth gear 132. The sixth gear 132 is disposed on the connecting shaft 130 at an end opposite the fifth gear 128. The sixth gear 132 and connecting shaft 130 rotate with the fifth gear 128.

Referring to FIGS. 5 and 6, the operation of one embodiment of the positioning apparatus 12 is more clearly depicted. FIG. 5 shows the shuttle 30 in the loaded position. FIG. 6 shows the shuttle 30 in the unloaded position. The shuttle 30 is raised or lowered depending on the direction the cam features 80 are rotated. In the embodiment shown, the shuttle 30 moves toward the unloaded position, as designated by the vertical arrow in FIG. 6, when the cam feature 80 is turned in a clockwise direction, as designated by the curved arrow in FIG. 6. Conversely, the shuttle 30 moves toward the loaded position when the cam feature 80 is turned in a counterclockwise direction. More specifically, the output gear 104 drives the first gear 120, causing the first set of gears 110 to rotate. Torque from the first set of gears 110 is transmitted to the second set of gears 112 via the connection shaft 132. Torque is then transmitted from the first and second sets of gears 110,112 to the cam features 80 to actuate the shuttle.

The stops 70 contact the top panel 38 of the shuttle 30 when the shuttle is in the unloaded position. The stops help make sure that the storage device 10 is accurately located and inhibit high impact loads from tilting or mispositioning the storage device 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for positioning a data storage device, the apparatus comprising:
   a shuttle adapted to receive the data storage device, the shuttle having a cam pin and a guide pin;
   a frame adapted to receive the shuttle, the frame having a stop, a cam pin slot that receives the cam pin, and a guide pin slot that receives the guide pin; and
   a lift mechanism configured to move the shuttle between an unloaded position and a loaded position;
   wherein the stop is configured to inhibit movement of the shuttle when the shuttle is in the unloaded position.

2. The apparatus of claim 1 wherein the frame further comprises a side panel having a top surface, the stop being disposed proximate the top surface.

3. The apparatus of claim 1 wherein the stop further has a cushion disposed proximate the shuttle when the shuttle is in the unloaded position.

4. The apparatus of claim 3 wherein the cushion is at least partially compressed by the shuttle when the shuttle is in the unloaded position.

5. The apparatus of claim 1 wherein the lift mechanism further comprises a cam feature configured to engage the cam pin to move the shuttle between the unloaded and loaded positions.

6. The apparatus of claim 5 wherein the lift mechanism further comprises a motor and a set of gears, the set of gears being disposed on the frame and configured to rotate the cam feature in response to rotation of the motor.

7. The apparatus of claim 1 wherein the guide pin slot permits the shuttle to move between the unloaded and loaded positions.

8. An apparatus for positioning a data storage cartridge, the apparatus comprising:
   a drive module configured to engage the data storage cartridge;
   a frame disposed proximate the drive module, the frame including first and second side panels and first and second stops disposed on the first and second side panels, respectively;
   a shuttle adapted to receive the data storage cartridge and movably disposed between the first and second side panels; and
   a lift mechanism configured to move the shuttle between an unloaded position and a loaded position;
   wherein the shuttle further has a cam pin and a guide pin and the frame further has a cam pin slot and a guide pin slot, the cam pin and guide pin extending through and slidable along the cam pin and guide pin slots, respectively, when the shuttle is moved between the unloaded and loaded positions;
   wherein the first and second stops inhibit the data storage cartridge from tilting when the shuttle is in the unloaded position.

9. The apparatus of claim 8 wherein at least one of the first and second stops further includes a flexible portion adapted to move when contacted by the shuttle when the shuttle is in the unloaded position.

10. The apparatus of claim 8 wherein the first and second stops are disposed in a common plane.

11. The apparatus of claim 8 wherein the shuttle further has a backstop adapted to inhibit movement of the data storage cartridge in a first direction, the backstop being positioned opposite an opening that receives the data storage cartridge.

12. The apparatus of claim 11 wherein the lift mechanism further has a cam feature having a spiral groove configured to engage the cam pin to move the shuttle between the unloaded and loaded positions when the cam feature is rotated.

13. The apparatus of claim 11 wherein the cam feature further comprises a gear portion and the lift mechanism further comprises a motor having an output shaft, an output gear disposed on the output shaft, and at least one intermediate gear rotatably coupling the output gear and the gear portion.

14. An elevator assembly for positioning a data storage cartridge, the elevator assembly comprising:
   a shuttle including:
      an opening adapted to receive the data storage cartridge;
      a backstop positioned opposite the opening adapted to inhibit movement of the data storage cartridge in a first direction; and
      first and second side members configured to inhibit movement of the data storage cartridge in a second direction, the first and second side members having first and second cam pins, respectively;
   a frame including:
      first and second side panels having first and second cam slots, respectively; and
      first and second stops disposed on the first and second side panels, respectively, the first and second stops being configured to inhibit movement of the data storage cartridge in a third direction; and
   a lift mechanism including:
      a motor having an output shaft and an output gear disposed on the output shaft;
      a first set of gears rotatably coupled to the first panel and engagable with the output gear;
      a second set of gears rotatably coupled to the second panel and connected to the first set of gears by a shaft; and
      first and second cam features configured to be engaged by the first and second sets of gears, respectively;
   wherein the first and second cam features are adapted to engage the first and second cam pins, respectively, to move the shuttle between an unloaded position and a loaded position.

15. The elevator assembly of claim 14 wherein the first and second stops are adapted to engage the data storage cartridge when the data storage cartridge is in the unloaded position.

16. The elevator assembly of claim 14 wherein the first and second stops are disposed in a common plane.

17. The elevator assembly of claim 14 wherein either the first stop or the second stop includes a flexible portion configured to flex when contacted by the shuttle.

18. The elevator assembly of claim 14 wherein the first set of gears has more gears than the second set of gears.

19. The elevator assembly of claim 14 wherein the first and second cam features include first and second spiral grooves adapted to receive the first and second cam pins, respectively.

20. The elevator assembly of claim 14 wherein the shuttle further comprises first and second guide pins disposed on the first and second side members and the frame further comprises first and second guide slots disposed in the first and second plates, respectively, the first and second guide slots being adapted to receive the first and second guide pins and direct movement of the shuttle in a third direction.

* * * * *